United States Patent Office 3,454,621
Patented July 8, 1969

3,454,621
PREPARATION OF BLOCKED ISOCYANATE ADDUCTS
John H. Engel, Jr., Grosse Pointe, Mich., assignor to Chrysler Corporation, Highland Park, Mich., a corporation of Delaware
No Drawing. Filed June 17, 1965, Ser. No. 464,837
Int. Cl., C07c *119/04;* C07d *41/06;* C08g *22/32*
U.S. Cl. 260—471                                 7 Claims

ABSTRACT OF THE DISCLOSURE

A room temperature process for preparing certain isocyanate containing compounds in which all of the isocyanates are blocked with a blocking agent. The process comprises adding a blocking agent, catalyst and isocyanate containing compound to a liquid aliphatic hydrocarbon solvent, forming a solution of these components, and separating the desired blocked isocyanate product precipitate. No external heating is used in the process.

---

This invention relates to a process for synthesizing blocked isocyanate adducts, that is, isocyanate derivatives in which the isocyanate groups have been reacted with another compound to produce a urethane which, upon heating of the derivative, will react as if the isocyanate groups were regenerated. A typical example of such an adduct is the urethane produced by reacting an isocyanate with a phenol: $RNCO + ArOH \rightarrow RNHCOOAr$. More particularly, this invention relates to an economical, room temperature process for producing such blocked isocyanate adducts in substantially quantitative yields.

Blocked isocyanates are known materials whose chemical and physical properties make them of interest as intermediates in many fields of urethane polymer application. Typically, blocked isocyanates are used in polymer systems, such as one-component polyurethane coatings, when it is desired that the isocyanate not react with the other polymer components at room temperature. In obtaining a blocked isocyanate in such a system, it has heretofore been the practice to react the isocyanate with a polyol so as to form an isocyanate terminated prepolymer and then add a blocking agent such as phenol to effect blocking of the isocyanate groups in situ. The present invention contemplates effecting blocking of the isocyanate prior to incorporating it with the polyol component of the polymer system. The adduct can then be dissolved in a polyol so as to produce a mixture with indefinite storage life at room temperature. Upon heating, however, the isocyanate adduct will react as if the blocking agent were split off thereby regenerating the isocyanate group which can then react with the polyol to give a polyurethane.

Despite the desirability of using a blocked isocyanate adduct in certain systems, their isolation outside of the research laboratory is seldom encountered. The reason for this is that only a few of the blocked isocyanate adducts are offered on the market and these sell for a price in the range of three or four dollars a pound. Accordingly, few manufacturers can afford to use such an expensive chemical in products such as urethane sealants and coatings which must be competitively priced with more standard materials. Likewise, few manufacturers of end-item products have the trained personnel to synthesize the blocked isocyanate adducts. For example, Du Pont has described such a synthesis procedure in a bulletin it published entitled, Isocyanate Intermediates for Urethane Coatings, written by W. J. Remington and J. C. Lorenz and identified as Paint Bulletin PB–3. On pages 4 and 5 of this bulletin a procedure is set forth wherein a phenol blocking agent is added to ethyl acetate so as to make a 75 percent solution and the solution then boiled and the excess ethyl acetate distilled off so as to form an anhydrous solution. This solution must then be carefully added to a solution of an isocyanate terminated polymer so that the temperature does not exceed 175° F. After this addition, the reaction mixture must then be heated for several hours at a temperature of 165–175° F. Finally, in order to obtain a dry material, resort must be made to processing the solution by complicated casting, drowning or vacuum drying techniques.

While the above procedure will produce a blocked isocyanate product, it will readily be apparent that it is too costly, time consuming and difficult for the average urethane product manufacturer.

Accordingly, it is an object of this invention to provide a process for the synthesis of blocked isocyanate adducts which is simple and easy to carry out.

A further object is to provide a process which is especially well suited for synthesizing the blocked adducts to tolylene diisocyanate, 1,6-hexamethylene diisocyanate and polymethylene polyphenylisocyanate.

A still further object is to provide a process for synthesizing blocked isocyanates which can be employed as a continuous process and which requires no external heating.

Other objects and advantages of this invention will become apparent from the following detailed description thereof.

In accordance with this invention there is provided a method of making the blocked isocyanate adducts of tolylene diisocyanate, 1,6-hexamethylene diisocyanate and polymethylene polyphenylisocyanate which comprises adding a blocking agent, catalyst, and one of the aforementioned isocyanates to a liquid aliphatic hydrocarbon solvent. A short time after the above components have been dissolved in the solvent so as to form a homogeneous solution, the components will react and the desired product, namely the blocked isocyanate adduct, will precipitate from the solution in the form of solid particles which can be collected by any filtering technique. The conversions that have been obtained using this process are constantly higher than 95 percent.

The solvent which is used in the process of this invention must be a liquid material in which the isocyanate, catalyst, and blocking agent compounds are soluble to an extent whereby sufficient amounts of reactants will be brought into contact to have a commercially feasible reaction. In addition the solvent must be a material which will be substantially inert to the reactants and reaction product and in which the blocked isocyanate adduct is substantially insoluble. It has been found that liquid aliphatic hydrocarbons containing from about 5 to 15 carbon atoms and mixtures of such hydrocarbons are excellent solvents for use in this invention. The solvent may be straight or branched chained and may contain one or more double bonds. Examples of such solvents include pentane, 2,3-dimethyl butene-2, heptane, 2,2,3-trimethyl pentane, nonane, 3-methyl, 4-ethyl hexane, decene-3, 5-propenyl nonane, pentadecane, 2,2,5-trimethyl dodecane, naphtha, petroleum ether and ligroin. The preferred solvents in this invention are naphtha, petroleum ether, or ligroin. For economic reasons, naphtha is the most preferred solvent.

The blocking agent used in this invention, as mentioned above, must be soluble in the solvent and contain at least one active hydrogen atom. The term "active hydrogen atom" refers to hydrogen which, because of its position in the molecule, displays activity according to the Zerewitinoff test as described by Kohler in J. Am. Chem. Soc., 49, 3181 (1927). In addition, the blocking agent should be capable of splitting from the blocked isocyanate adduct when the adduct is heated above room temperature, preferably to a temperature in the range of about 120° C. to 200° C. Compounds which can be used as blocking agents in this invention includes phenol, cresol including the ortho, meta and para isomers thereof, diethyl malonate, ethyl acetoacetate, ethyl cyanoacetate, α-pyrrolidone and ε-caprolactam. The preferred blocking agent in this invention is phenol.

The process of this invention is not restricted to the use of any particular reaction temperature or pressure to effect precipitation of the blocked adduct. Preferably, atmospheric pressure is employed on the reaction system and no advantage has been recognized in using either subatmospheric or superatmospheric pressure. Likewise, there is no requirement that the solvent and/or reactants be heated to above normal room temperature or approximately 25° C. In fact, high temperatures should preferably be avoided in this process, since it has been found that when the temperature exceeds about 75° C. there is a likelihood that the blocking agent will begin to oxidize and give rise to an oxidation product which is difficult to separate and handle and which is inclined to become entrapped in the precipitated product. In addition, after the reaction has started there is a danger at high reaction temperatures that the isocyanate may react with the active hydrogen in the urethane group of a blocked isocyanate adduct rather than with the blocking agent. While the process of this invention may be carried out at room temperature, it should be understood that the reaction may be carried out below room temperature, if desired, by cooling the solvent. However, no advantage is apparent at this time to effect the reaction at such subnormal temperature. Reaction temperatures below 10° C. are preferably avoided due to the slow rate of reaction. The reaction which occurs in the process of this invention is exothermic and, hence, precaution should be taken to control the temperature. If necessary, external methods of cooling, such as ice baths, can be used in maintaining a proper temperature.

That a blocked isocyanate adduct could be readily synthesized from a room temperature solution of reactants is quite surprising since an unheated solution of a blocking agent such as phenol and an isocyanate will not react to any significant extent. In the process described herein, it is believed that the reaction is triggered by certain catalysts which are a necessary component of the reaction mixture of this invention. The catalysts which can be used in this invention are selected from the group consisting of lead naphthenate, ferric 2-ethylhexoate, stannous octoate, dibutyltin di(2-ethylhexoate), dibutyltin dilaurate, tributyltin cyanate, tributyltin o-phenylphenate, sodium trichlorophenate, sodium propionate, potassium oleate, bismuth nitrate, stannic chloride, ferric chloride, antimony trichloride, and mixtures of the foregoing. Other catalysts of comparable or greater activity may also be employed. In general, when mixtures of the foregoing catalysts are employed the ratios can be varied within the complete range of proportions. The preferred catalysts for use in this invention is lead naphthenate. The quantity of catalyst employed is generally dependent upon its activity and/or the temperature of the reactants. Obviously, more reactive catalysts or higher reactant temperatures require smaller amounts of catalyst. In general, quantities between about 0.05 and 2.0 weight percent of catalyst, based on the combined weight of the isocyanate and blocking agent components in the reaction mixture, can be used, and preferably between about 0.10 and 1.0 weight percent. The above catalysts are commercially available and are generally obtainable as substantially anhydrous, stable materials. If desired, however, additional water may be removed by conventional procedures such as vacuum stripping. In view of the small quantity of catalyst employed, however, its water content is generally inconsequential.

As mentioned hereinabove, the isocyanate, catalyst, and blocking agent reactants are added to the solvent which is at about room temperature. These reactants may be added to the solvent in any order and preferably any water in the solvent or reactants is removed prior to the combining of the reactants. Some of the reactants such as the blocking agent and catalyst may be in a solid form when added and, hence, it will be necessary to stir the mixture so as to obtain a homogeneous solution. It has been found that in order to insure that each isocyanate group of the isocyanate compound is blocked, there should be about a 5 percent excess of the blocking agent over the stoichiometric amount required to react with all of the isocyanate groups. Thus, for example, at least 2.1 moles of phenol should be added for each mol of a diisocyanate which is added to the solvent.

It has been found that the reaction involved in this invention will take place faster if the solution is agitated as by stirring, and commencement of the reaction may be noted by an increase in temperature of the solution. The blocked isocyanate adduct will subsequently precipitate and termination of the reaction will be evidenced by a cooling of the solution. The product precipitate may then be separated from the soltuion as by filtering and requires no other treatment as it has been found to be quite pure and free of entrapped foreign matter. As mentioned above, the process of this invention is especially well suited for the synthesis of adducts of 1,6-hexamethylene diisocyanate, polymethylene polyphenylisocyanate, and tolylene diisocyanate including the 65/35, 2,4–2,6 isomers and 80/20, 2,4–2,6 isomers of tolylene diisocyanate which are commonly used in the urethane industry.

From the foregoing description, it will be readily apparent that the process of this invention lends itself especially well for use as a continuous process wherein the reacted solution is put through a filter means to separate the product and the filtrate is recycled as solvent.

The following examples are provided so as to more clearly illustrate the process of this invention to those skilled in the art and they should not be employed to unduly restrict the invention as disclosed and claimed herein. The reactions set forth in the following examples were conducted under atmospheric pressure. The term "conversion" is employed in this specification and is defined as follows:

$$\text{Percent conversion} = \frac{(\text{mols product obtained}) \times 100}{\text{mols reactants changed}}$$

EXAMPLE I

A charge of 1.5 liters of naphtha which had been previously dried over calcium sulfate was placed into a 3-liter beaker equipped with a stirrer and thermometer. The naphtha which was at a temperature of 25° C. was then stirred and 240 grams of phenol in solid form was added and completely dissolved in the naphtha. Then, 180 grams of liquid tolylene diisocyante (80% 2,4 isomer, 20% 2,6 isomer) was added to the stirred naphtha and in a few seconds a homogeneous solution was obtained. Lastly, 1 gram of catalyst, which was a solution of lead naphthenate (25% lead) in an aliphatic solvent and which was marketed by the Nuodex Products Division of Heyden Newport Chemical Corp. was added. After ten minutes, during which time the solution was stirred, the temperature rose to 30° C. After one hour and continuous stirring the temperature reached 45° C. and a large quantity of white precipitate had formed. Shortly thereafter, solvent cooled to room temperature and the precipitate was filtered and allowed to dry in air overnight. 370 grams of product was obtained representing a conversion of 99 percent. The product was the phenol blocked adduct of tolylene diisocyante and had a melting point of 131–134° C.

The excellent quality of the blocked isocyanate adducts produced by the process of this invention is attested to by the urethane products in which the adducts of this invention are used as the isocyanate component. For example, an excellent coating was obtained when 276 grams of the phenol blocked adduct of tolylene diisocyanate prepared as described hereinabove was mixed with 93 grams of trimethylolpropane and 148.5 grams of a block copolymer of propylene and ethylene oxide in which there were 70 weight percent of propylene oxide and 30 weight percent of ethylene oxide. The copolymer has terminal primary hydroxyl groups, a molecular weight of 1750 and is marketed by Wyandotte Chemicals Corporation as Pluronic L 63. The excellent urethane coating was produced when the foregoing reaction mixture was heated to a temperature of about 150° C.

EXAMPLE II

The m-cresol blocked adduct of 1,6-hexamethylene diisocyanate is prepared by adding 168 grams of 1,6 hexamethylene diisocyanate to 3 liters of n-heptane which is at a temperature of about 25° C. The n-heptane is stirred and 275 grams of m-cresol and 0.8 gram of bismuth nitrate is added to the n-heptane and dissolved therein so as to form a homogeneous solution. After a period of about one hour, the solution will reach a temperature of about 40° C. and a precipitate is formed. Shortly thereafter, the solvent temperature will start to decrease and the precipitate is then filtered from the solvent system and allowed to dry in air. 376 grams of the dried precipitate, which is the cresol blocked adduct of 1,6-hexamethylene diisocyanate, is obtained, representing a conversion of 97 percent.

EXAMPLE III

One liter of 2,3-dimethyl butene-2 having a temperature of about 25° C. is added to a beaker equipped with a thermometer and stirrer. While the 2,3-dimethyl butene-2 is stirred, 770 grams of polymethylene polyphenylisocyanate, 820 grams of ethyl acetoacetate and 6 grams of stannous acetoate are added and dissolved therein so as to form a homogeneous solution. After one hour and continuous stirring, the temperature of the solution is about 50° C. and a precipitate is formed. Termination of the reaction is marked by a decline of the solution temperature and the precipitate can then be collected by filtration and allowed to dry. 1520 grams of the dried precipitate, which is the ethyl acetoacetate blocked adduct of polymethylene polyphenylisocyanate, is obtained representing a conversion of 98 percent.

It is apparent that the objects of this invention have been accomplished. A new process for preparing blocked isocyante adducts has been provided which is simple and easy to carry out and which enables the large scale production of such adducts at very low cost.

I claim:

1. A room temperature process for producing a blocked isocyanate compound which comprises adding to a liquid solvent which is at about room temperature and which is selected from the group consisting of aliphatic hydrocarbons having from about 5 to 15 carbon atoms and mixtures thereof, (1) a blocking agent selected from the group consisting of phenol, cresol, diethyl malonate, ethyl acetoacetate, ethyl cyanoacetate, α-pyrrolidone and ε-caprolactam, (2) an isocyanate selected from the group consisting of tolylene diisocyanate, 1,6-hexamethylene diisocyanate and polymethylene polyphenylisocyanate, and (3) a catalyst selected from the group consisting of lead naphthenate, ferric 2-ethylhexoate, stannous octoate, dibutyltin di (2-ethylhexoate), dibutyltin dilaurate, tributyltin cyanate, tributyltin o-phenylphenate, sodium trichlorophenate, sodium propionate, potassium oleate, bismuth nitrate, stannic chloride, ferric chloride, antimony trichloride and mixtures of the foregoing, dissolving said blocking agent, isocyanate, and catalyst in said solvent to form a homogeneous solution, reacting said blocking agent and isocyanate without externally heating the solution, maintaining said solution at a temperature less than about 75° C. and separating the precipitated product from said solvent; the process being further characterized in that the quantity of said blocking agent added to the solvent is at least 5 weight percent in excess of the stoichiometric amount required to react with each isocyanate group of the isocyanate compound and the quantity of catalyst added to the solvent is about 0.05 to 2.0 weight percent of the combined weight of the isocyanate and blocking agent to be added.

2. The process of claim 1 wherein the solvent is selected from the group consisting of naphtha, petroleum ether and ligroin.

3. The process of claim 1 wherein the catalyst is lead naphthenate.

4. The process of claim 1 wherein the quantity of catalyst added to the solvent is about 0.10 to 1.0 weight percent of the combined weight of the isocyanate and blocking agent.

5. A room temperature process for producing a blocked isocyanate compound which comprises adding to a liquid solvent which is at about room temperature and which is selected from the group consisting of aliphatic hydrocarbons having about 5 to 15 carbon atoms and mixtures thereof, (1) a blocking agent selected from the group consisting of phenol, m-cresol, diethyl malonate, ethyl acetoacetate, ethyl cyanoacetate, α-pyrrolidone and ε-caprolactam, (2) tolylene diisocyanate, and (3) lead naphthenate, dissolving said blocking agent, tolylene diisocyanate, and lead naphthenate in said solvent to form a homogeneous solution, reacting said blocking agent and isocyanate with external heating the solution, maintaining said solution at a temperature less than about 75° C., and separating the precipitated product from said solvent; the process being further characterized in that the quantity of said blocking agent added to the solvent is at least 5 weight percent in excess of the stoichiometric amount required to react with each isocyanate group of the tolylene diisocyanate and the quantity of lead naphthenate added to the solvent is about 0.05 to 2.0 weight percent of the combined weight of the tolylene diisocyanate and blocking agent to be added.

6. The process of claim 5 wherein the solvent is selected from the group consisting of naphtha, petroleum ether and ligroin.

7. The process of claim 5 wherein the blocking agent is phenol.

References Cited

UNITED STATES PATENTS

| | | | |
|---|---|---|---|
| 2,801,990 | 8/1957 | Seeger et al. | 260—75 |
| 3,036,999 | 5/1962 | Worsley et al. | 260—75 |
| 3,317,463 | 5/1967 | Schonfeld et al. | 260—453 |

LORRAINE A. WEINBERGER, *Primary Examiner.*

L. A. THAXTON, *Assistant Examiner.*

U.S. Cl. X.R.

260—77.5, 239.3, 326.5, 465, 465.4, 482